A. BERNEY.
TEA KETTLE BOILER.
No. 83,449. Patented Oct. 27, 1868.
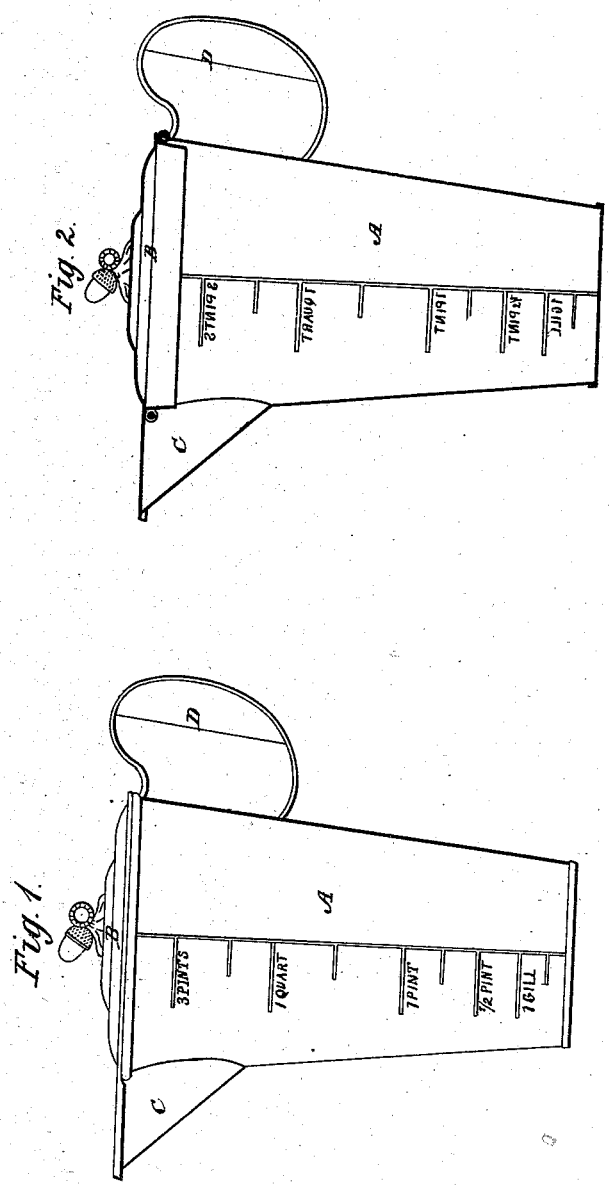
Witnesses:
N. Leclerc
H. Kinner
Inventor:
Alfred Berney

ALFRED BERNEY, OF JERSEY CITY, NEW JERSEY.

Letters Patent No. 83,449, dated October 27, 1868.

TEA-KETTLE BOILER.

The Schedule referred to in these Letters Patent and making part of the same.

*To all whom it may concern:*

Be it known that I, ALFRED BERNEY, of Jersey City, in the county of Hudson, and State of New Jersey, have invented a new and useful Tea-Kettle Boiler, of which the following is a full, clear, and exact description, reference being had to the accompanying drawing, forming part of this specification, and in which—

Figure 1 represents a side elevation of my improved tea-kettle boiler, and

Figure 2 a vertical section thereof.

Similar letters of reference indicate corresponding parts.

This, my invention, while partaking, in its general character or action, of that of a water-boiler for glue and other purposes, essentially differs therefrom in several important respects.

My anti-burning boiler is both cheap, handy, and, when known, almost indispensable for kitchen-use, as, for instance, in boiling milk, rice, farina, wheaten grits, maizena, corn-starch, hominy, samp, peas, and for cooking custards, jellies, ice-creams, (before freezing,) puddings, and a variety of other articles.

It consists, and herein the utility will be apparent, of a tin pitcher, of a comparatively high, tapering form, so that it will fit any tea-kettle, and is incapable, as it were, of boiling over, the same being provided with a lid, spout, and handle, and being graduated on the outside, made readable also from the interior, into gills, quarts, or other quantities, so that the device may be used as a measure, as well as a pitcher and tea-kettle boiler.

Referring to the accompanying drawing, A represents the body of the boiler, made of tin, and of a high, tapering form, so as to enable it to fit or be received within almost any-sized tea-kettle, which will be found a great convenience in domestic use, as compared with requiring a utensil of special construction to receive it.

Said boiler is provided with a lid, B, spout, C, and handle, D, which make it applicable as a closed pitcher, and the same is furthermore graduated on one or opposite sides, readable from both the interior and exterior, as represented in the drawing, into gills, pints, and quarts, or other quantities, which makes the device applicable also as a measure.

A boiler having these threefold functions, and constructed so as to fit ordinary tea-kettles of different sizes, has never before been devised, and will be found of the greatest convenience for kitchen-use.

Having thus described the invention,

I claim, as a new and useful article of manufacture—

A combined tea-kettle boiler, pitcher, and measure, made of tapering form, as described, and provided with a handle, lid, and spout, also graduated into quantities, essentially as herein shown and described.

ALFRED BERNEY.

Witnesses:
A. LE CLERC,
A. KINNIER.